June 4, 1968  W. NEUGEBAUER ET AL  3,386,804
PROCESS FOR SEPARATING AMMONIA FROM NITRILES
Filed Aug. 25, 1966
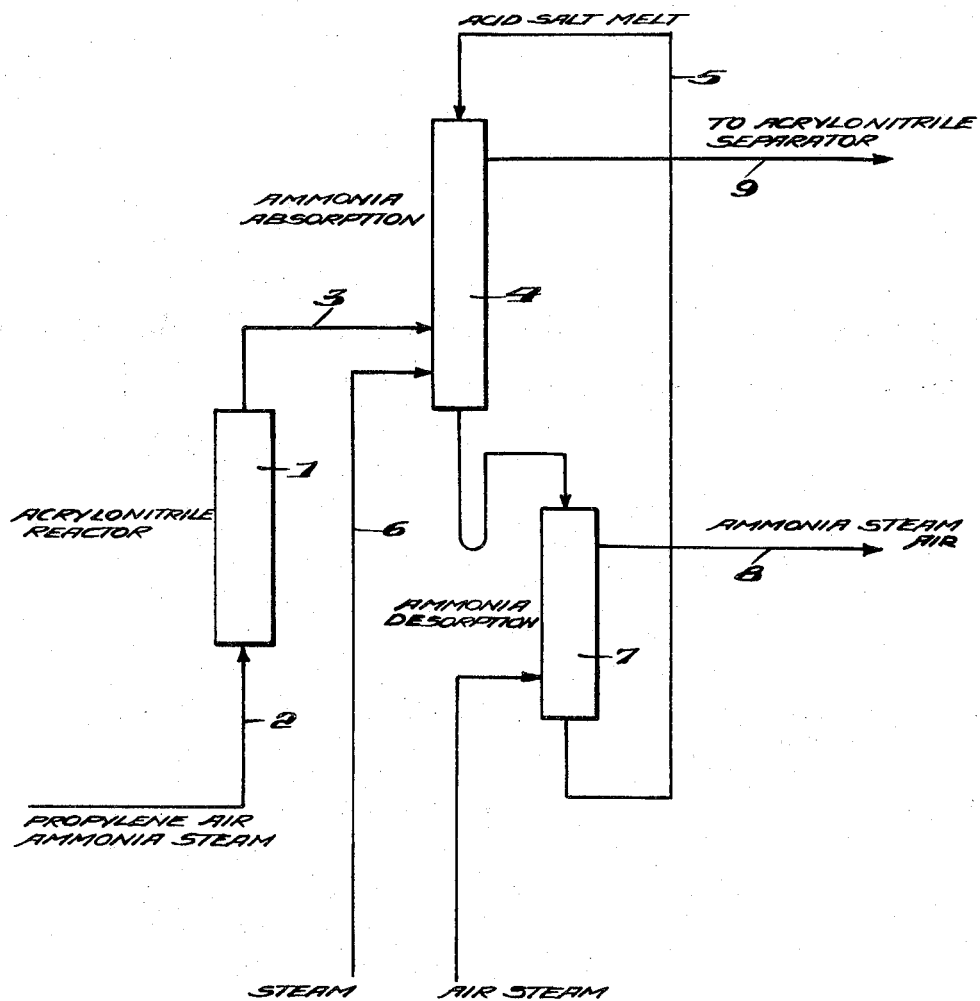
INVENTORS
WALTER NEUGEBAUER,
LOTHAR SCHMIDT,
BY
Bailey, Stephens & Huettig
ATTORNEYS

United States Patent Office 3,386,804
Patented June 4, 1968

3,386,804
PROCESS FOR SEPARATING AMMONIA
FROM NITRILES
Walter Neugebauer and Lothar Schmidt, Constance (Bodensee), Germany, assignors to Deutsche Gold- und Silber-Scheideanstalt vormals Roessler, Frankfurt am Main, Germany
Filed Aug. 25, 1966, Ser. No. 575,165
Claims priority, application Germany, Sept. 2, 1965, D 48,109
9 Claims. (Cl. 23—196)

ABSTRACT OF THE DISCLOSURE

Process for the separation of ammonia from a gas mixture containing ammonia and a gas phase organic nitrile preferably in the presence of water which comprises passing such gas mixture through an acid salt melt preferably in the presence of water at a temperature between about 90° C. and 300° C., the period of contact of said gas mixture with said acid salt melt being sufficiently long that the ammonia in the gas mixture is absorbed substantially completely and sufficiently short that substantially no hydrolysis of the nitrile occurs.

---

The present invention relates to an improved process for the separation of ammonia from nitriles and particularly to such a process which permits economic recovery of the ammonia thus separated.

Carboxylic acid nitriles, such as acrylonitrile, methacrylonitrile, acetonitrile and the like, according to recent processes are preferably produced technically by heterogeneous catalysis in the ammonoxidation of hydrocarbons.

For example, in the synthesis of acrylonitrile on bismuth and molybdenum containing catalysts, a mixture of propylene, ammonia, air and steam is used as the starting gas. The product gas leaving the reaction in addition to acrylonitrile also contains ammonia, acetonitrile, hydrocyanic acid, propylene, acrolein, carbon oxides, steam, nitrogen and oxygen, as well as small amounts of various nitriles, aldehydes and acids. The separation and purification of the acrylonitrile requires the separation of ammonia as a first step especially as ammonia, because of the presence of water, causes a number of undesired side reactions such as the polymerization or hydrocyanic acid or the reaction of aldehydes with hydrocyanic acid to produce cyanhydrins. The ammonia itself may also react, for example, with acrylonitrile to form iminodipropionic acid nitrile. The presence of ammonia in the product gas cannot be avoided because of incomplete conversion. In fact, an excess of ammonia in the starting gas and a minimum content of ammonia in the product gas is considered advantageous for a high yield of acrylonitrile (German published application 1,165,015).

A process is known in which the product gas is washed with dilute sulfuric acid after it leaves the reactor. According to this procedure all of the ammonia is removed from the product gas stream to produce a dilute solution of ammonium bisulfate. This solution can be neutralized with ammonia and evaporated to dryness to produce ammonium sulfate. This procedure leaves much to be desired if one wishes to recover the ammonia in free form. Furthermore, in addition to ammonia, portions of nitriles, hydrocyanic acid and acrolein are taken up in the sulfuric acid used and these must be removed by distillation.

It is also known that ammonia can be separated from gas mixtures, especially mixtures with acid gases, by passing such gas mixtures through a melt of acid alkali metal or ammonium sulfates or phosphates and, if desired, the melt subsequently heated to a higher temperature to effect desorption and recovery of the ammonia taken up therein.

According to the invention it was found that ammonia can be separated and also recovered from gas phase nitriles or such gas phase nitriles containing water vapor or other gas phase mixtures containing nitriles and water vapor if they are passed through an acid melt at a temperature between 90 and 300° C., preferably between 125 and 250° C., and maintained in contact therewith only for such a short time that hydrolysis of the nitrile does not occur and then, if desired, heating the melt further to a temperature between 300 and 500° C., preferably between about 350 and 450° C., to effect desorption of the ammonia taken up by the melt. It was unexpected that such a separation would be successful as it is known that nitriles can be hydrolysed to their corresponding acids with recovery of their nitrile nitrogen as ammonia by introducing them into acid melts in the presence of water at temperatures up to 250° C.

In the process according to the invention the time the gas mixture remains in contact with the acid salt melt is sufficiently long that the ammonia absorption is practically quantitative but sufficiently short that no hydrolysis of the nitrile takes place. Such period of contact which is to be maintained depends upon a number of parameters, such as, temperature, concentration, material transfer in the gas space and in the melt, microkinetic reaction velocity in the melt and especially upon the reaction surface supplied by the melt. The latter again depends upon the geometric form of the gas absorption vessel. Nevertheless, it was found that the period of contact in which the ammonia is practically completely obsorbed but the gas phase nitriles are not yet hydrolysed is very easy to ascertain at the absorption temperatures mentioned above even under different given conditions with respect to concentration of ammonia and nitriles in the gas mixture. For example, it was ascertained that upon passage of a gas stream with a 2 vol. percent content of ammonia through a glass column 40 cm. long and having an inner diameter of 3 cm. provided with indentations (Vigreux column) containing a melt of equimolar quantities of sodium bisulfate and potassium bisulfate maintained at 200° C. which flowed countercurrently to the rising gas stream, an average period of contact of 0.2 sec. sufficed for the melt to take up 99.6% of the ammonia. In contrast thereto, when a gas stream containing 5 vol. percent acrylonitrile was passed through the same apparatus the hydrolysis of the nitrile was less than 0.5% at periods of contact below 6 seconds. In general, the periods of contact should not exceed 100 seconds. Expediently the periods of contact employed are between 0.1 and 50 seconds and preferably are between about 0.2 and 20 seconds.

Countercurrent wash columns which are sprayed with the acid salt melt have proved favorable as the vessels for contacting the ammonia and nitrile containing gases with the acid salt melt.

The acid salt melts employed according to the invention are melts of such substances which contain acid hydrogen atoms and the term acid salt melt is employed herein to signify this type of melt. Preferably the acid salts of phosphoric and/or sulfuric acid, especially the acid alkali metal and ammonium salts of such acids are used in the production of such melts. Expediently, salts or salt mixtures with a low melting point are selected for such acid melts. For example, a mixture of 53.5 mol percent of sodium hydrogen sulfate (sodium bisulfate) and 46.5 mol percent of potassium hydrogen sulfate (potassium bisulfate) already melts at 125° C. Mixtures of sodium bisulfate and potassium bisulfate containing between 75 and 35 weight percent of sodium bisulfate and corresponding to a molar ratio of sodium to potassium bisulfate between 3:1 and 3:5 have been found particularly suitable. Another suitable mixture, for instance, is of 83 mol percent of ammonium bisulfate and 17 mol percent of potassium bisulfate which melts at 110.5° C. Still another suitable mixture, for instance, is a mixture of potassium bisulfate, sodium bisulfate, potassium dihydrogen phosphate and ammonium sulfate in a molar ratio of 44:50:11:2 which forms a melt usable at 180° C.

The addition of other salts such as lithium bisulfate and cesium bisulfate renders it possible to produce salt melts with lower melting points. For example, a mixture containing potassium, sodium, cesium and lithium hydrogen sulfates and ammonium sulfate in a molar ratio of 12:12:8:12:1 provides a melt which can be used at temperatures down to about 93° C.

It has been found advantageous to add neutral salts such as the alkali metal sulfates and/or phosphates to the acid melt. This measure increases the velocity and the completeness of the ammonia desorption. The addition of the neutral salt, for example, sodium or potassium sulfate or mixtures thereof, can amount up to about 20 weight percent of the melt. The neutral salt is only dissolved to a certain extent by the acid melt and the remainder remains suspended in the melt. As this suspended portion remains finely divided, no disturbances are engendered thereby when the melt is recycled.

The acid salt melt in addition to taking up ammonia also takes up a portion of the water contained in the product gas. The quantity of water vapor taken up depends upon the temperature of the acid salt melt as well as upon the pretreatment of the acid salt melt. The salt melt evidently is able to dissolve the water physically. It is even possible to effect substantial drying of the product gas which can be of advantage for certain procedures employed for processing nitrile containing gases. If necessary or desirable the gases can be passed through another melt to effect further drying. The remaining constituents of the product gas, as was surprisingly found, pass through the acid salt melt practically unchanged. This is especially worthy of note in view of the ease of polymerization of the components as is, for example, the case with acrylonitrile and acrolein. The salt melt therefore in general remains colorless even when recycled. Yellow or brownish colorations which may occur occasionally, which possibly arise from traces of unknown impurities, can be eliminated by addition of oxidizing agents, such as, for example, aqueous $H_2O_2$ to the acid salt melt.

In order to be certain to avoid carry over of organic constituents from the ammonia absorption column to the ammonia desorption column in continuous operation of the process it has been found expedient to subject the salt melt to a stripping operation with a gas such as air or steam before it enters the ammonia desorption step. The ammonia desorption can be accelerated with the aid of a stream of carrier gas such as air or steam. As already indicated, the addition of neutral salts such as the sulfates or phosphates to the acid salt melt also aids in the ammonia desorption.

A certain decomposition of bisulfates into pyrosulfates may occur during the ammonia desorption at high temperatures especially when such melts have a high sodium content. However, it is possible to reconvert the pyrosulfate to bisulfate and thereby reestablish the original composition of the salt melt by the introduction of water or steam. This may not even be necessary if the product gas supplied to the ammonia absorption step contains sufficient water.

When an inert or carrier gas is employed to accelerate the ammonia desorption it can be expedient that this is effected in such a manner that a gas mixture suitable for nitrile synthesis is obtained. It is especially advantageous to carry out the process according to the invention continuously.

The process according to the invention can be carried out with mixtures of ammonia with nitriles which are in the gas phase under the operating conditions of the process. The nitriles can be of aliphatic, cycloaliphatic, aromatic or araliphatic nature, particularly those which are nitriles of hydrocarbons. The process is especially suited for separating ammonia from the reaction gases obtained in the ammonoxidation of propylene and isobutylene.

The accompanying drawing is a flowsheet illustrating the process according to the invention carried out continuously on the reaction gases obtained in the ammonoxidation of propylene to produce acrylonitrile.

Referring to such flowsheet, a gas mixture of propylene, air, ammonia and steam is supplied through conduit 2 to reactor 1 filled with a bismuth and molybdenum containing catalyst. The propylene is converted to the desired product by ammonoxidation. In addition, the by-products acetonitrile and hydrocyanic acid are also produced. Furthermore, the product gas leaving reactor 1 also contains carbon oxides, small quantities of acrolein, acids and higher nitriles as well as unconverted ammonia, unconverted propylene, steam, nitrogen and oxygen. The product gas is supplied over conduit 3 to ammonia absorption column 4 which is also supplied over conduit 5 with a melt of sodium bisulfate and potassium bisulfate in a molar ratio of 1.15:1. The entire quantity of ammonia and a part of the steam contained in the product gases are absorbed in absorption column 4 which is preferably maintained at a temperature between about 125 and 250° C. The product gas which has been freed of ammonia leaving column 4 through line 9 is supplied to an acrylonitrile separation operation which is carried out by methods known per se.

In order to remove small quantities of dissolved or entrained quantities of organic substances, steam is supplied to the bottom of column 4 through conduit 6 to strip the melt of such organic constituents. The salt melt containing the absorbed ammonia flows out of column 4 into desorption column 7 which preferably is maintained at a temperature between about 350 and 450° C. The ammonia is driven out of such melt with the aid of air and steam which are supplied to the bottom of column 7 and leaves such column over conduit 8. The melt which flows out of the bottom of column 7 is recycled to column 4 and reused for the ammonia absorption.

The following examples will serve to illustrate the process of the invention.

*Example 1*

A gas stream of 5 vol. percent of acrylonitrile, 5 vol. percent of ammonia and 90 vol. percent of air was passed at a velocity of 100 N liters/h. for 5 hours upwardly through a glass cylinder having an interior diameter of 4 cm. provided with a fused glass frit bottom having a pore size of 0.1 mm. and containing a melt of 258.5 g. of sodium bisulfate and 253.5 g. of potassium bisulfate maintained at 180° C. Thereafter the apparatus was rinsed with air for 10 minutes. Two cold traps maintained at $-5°$ C. and $-78°$ C. respectively were connected in series to the gas outlet at the top of the tube containing the melt. After completion of the run including the air rinse, 58.8 g. of acrylonitrile corresponding to $99.4 \pm 1\%$ of the acrylonitrile originally supplied in addition to a small quantity of water, but no ammonia, were found in such traps. The bisulfate melt was subsequently heated to 420° C. and a gas stream of 40 vol. percent of air and 60 vol. percent of steam passed therethrough. 17.4 g. of ammonia corresponding to 92% of that originally supplied were thus recovered.

*Example 2*

A gas stream of 5 vol. percent of acetonitrile, 5 vol. percent of ammonia, 20 vol. percent of steam and 70 vol. percent of propylene was passed for 6 hours at a velocity of 110 N liters/h. through the same salt mesh as described in Example 1 and in the same manner. Thereafter the apparatus was rinsed for ¼ hour with nitrogen. 59.5 g. of acetonitrile corresponding to $98.9 \pm 1\%$ of that supplied and 94 g. of water were recovered in the two colds traps which this time were maintained at −5° and −45° C. respectively. 12 g. of water remained in the salt melt. Ammonia was not found in the cold traps. A determination of the ammonia content of the salt melt indicated that it had taken up 24.8 g. or 99.2% of the ammonia supplied.

*Example 3*

A gas stream of 4.2 vol. percent of acrylonitrile, 3.1 vol. percent of ammonia, 1.4 vol. percent of hydrocyanic acid, 25 vol. percent of steam and 66.3 vol. percent of air was passed at a velocity of 110 N liters/h. at a temperature of 190° C. through 0.27 liter of a melt of 258.5 g. of sodium bisulfate, 253.5 g. of potassium bisulfate, 15.2 g. of sodium sulfate and 16.2 g. of potassium sulfate with the aid of a glass tube having an outlet cross-section of 7 mm.². After such gas stream had been passed through the melt for 2.5 hours followed by a 10 minute rinse with air 27.2 g. of acrylonitrile, corresponding to 99.5% of that supplied, 4.6 g. of hydrocyanic acid, corresponding to 99.2% of that supplied, were found in the two cold traps and wash bottle containing dilute NaOH through which the gases leaving the salt melt were passed. The salt melt was then heated to 380 to 400° C. and 150 N liters of a mixture of 50 vol. percent of air and 50 vol. percent of steam passed therethrough. 6.3 g. of ammonia corresponding to a 97% yield with reference to that supplied were recovered.

*Example 4*

A gas stream of 4 vol. percent of acrylonitrile, 3.1 vol. percent of ammonia, 1.2 vol. percent of hydrocyanic acid, 1.1 vol. percent of acrolein, 28.0 vol. percent of steam and 62.6 vol. percent of air was passed for 2.5 hours at a velocity of 120 N liters/h. at 170° C. through 0.4 liter of a melt of sodium bisulfate, potassium bisulfate and ammonium bisulfate in a molar ratio of 1:1:1 with the aid of a glass tube having an outlet cross-section of 9.6 mm.². Thereafter the melt was rinsed 10 minutes with air, 28.3 g. of acrylonitrile, 4.3 g. of hydrocyanic acid and 8.1 g. of acrolein corresponding to 99.6%, 99.3% and 97.6% of the quantities supplied were recovered in the traps through which the gases leaving the salt melt were passed. 6.8 g. of ammonia were recovered from the salt melt after it was heated to 450° C. while passing steam therethrough. This corresponds to a 96.1% yield with reference to the quantity supplied.

*Example 5*

A gas mixture of 6.1 vol. percent of propylene, 49 vol. percent of air, 8.5 vol. percent of ammonia and 36.4 vol. percent of steam was passed at a velocity of 110 N liters per hour through an electrically externally heated reactor consisting of a stainless steel tube 50 cm. long having an inner diameter of 2.7 cm. which was filled with 85 ml. of a granulated bismuth and molybdenum containing silica catalyst in the form of a fixed bed maintained at 510° C. in order to convert propylene to acrylonitrile. The gas leaving the reactor was passed with the aid of a tube having a free outlet cross-section of 7.1 mm.² through a melt of 323 kg. of sodium bisulfate and 317 kg. of potassium bisulfate held in a cylindrical vessel having an inner diameter of 4 cm. The melt absorbed all of the ammonia and a portion of the steam contained in the product gas. After 10 hours' operation the vessel containing the salt melt was replaced by another vessel containing the same quantity of salt melt as indicated above and the product gas passed through the second salt melt containing vessel for a further 10 hours.

10 N liters of steam were passed through the first vessel containing the salt melt and the ammonia for about 5 minutes at 300° C. to remove any residues of organic substance contained therein. The introduction of the steam was continued and the temperature of the melt raised to 430° C. whereby 30.6 g. of ammonia were recovered, corresponding to an ammonia recovery of about 3.1 g. per hour of operation. After the ammonia had been recovered from the first vessel it was used to replace the second vessel after it had been used 10 hours for ammonia absorption from the product gas. The described exchange of the ammonia absorption vessels was continued after every tenth hour of operation.

The gas stream which had been freed of ammonia by passage through the salt melt was passed through several cold traps in which 7.2 g. of acrylonitrile, 0.9 g. of acetonitrile and 1.2 g. of hydrocyanic acid were recovered per hour.

*Example 6*

130 N liters of a gas mixture of 3.7 vol. percent of benzonitrile, 3 vol. percent of toluene, 23 vol. percent of steam, 3 vol. percent of ammonia, 6.5 vol. percent of oxygen and 61 vol. percent of nitrogen at 182° C. were passed through a reaction vessel as described in Example 1 containing a melt of 253.5 g. of potassium bisulfate and 258 g. of sodium bisulfate in 1 hour. The ammonia was completely absorbed by the melt and 97% thereof was recovered therefrom by heating the melt to 400° C. with steam. 99.5% of the benzonitrile in the original gas mixture were recovered from the gas mixture after it had been passed through the salt melt.

*Example 7*

140 N liters of a gas mixture consisting of 6.5 vol. percent of cyclopropylcyanide, 15 vol. percent of steam, 5 vol. percent of ammonia and 73.5 vol. percent of nitrogen were passed through a salt melt as described in Example 6 at 181° C. in 1 hour. The ammonia was completely absorbed by the melt and 97.5% thereof was recovered therefrom by heating the melt to 400° C. with steam. 99.5% of the cyclopropylcyanide in the original gas mixture were recovered from the gas mixture after it had been passed through the salt melt.

We claim:

1. A process for the separation of ammonia from a gas mixture containing ammonia and a gas phase organic nitrile in the presence of water which comprises passing such gas mixture through an acid salt melt in the presence of water at a temperature between about 90° C. and 300° C., the period of contact of said gas mixture with said acid salt melt being sufficiently long that the ammonia in the gas mixture is absorbed substantially completely and sufficiently short that substantially no hydrolysis of the nitrile occurs said period of contact being less than 100 seconds.

2. The process of claim 1 in which said acid salt melt contains at least one acid salt selected from the group consisting of ammonium and alkali metal hydrogen sulfates and hydrogen phosphates.

3. The process of claim 2 in which said acid salt melt in addition contains at least one neutral salt selected from the group consisting of ammonium and alkali metal sulfates and phosphates.

4. The process of claim 2 in which said gas mixture is contacted with said acid salt melt at a temperature between about 125° C. and 250° C.

5. The process of claim 2 comprising in addition subsequently heating the acid salt melt containing the absorbed ammonia to a temperature between about 300° C. and 500° C. to drive off and recover ammonia from said melt.

6. The process of claim 2 comprising in addition subsequently heating the acid salt melt containing the absorbed ammonia to a temperature between about 350° C. and 450° C. to drive off and recover ammonia from said melt.

7. The process of claim 2 in which said gas mixture is an ammonia, organic nitrile and steam containing gas mixture obtained in the ammonoxidation of a hydrocarbon.

8. The process of claim 2 in which the period of contact of said gas mixture with the acid salt melt is between about 0.1 and 50 seconds.

9. The process of claim 2 in which the period of contact of said gas mixture with the acid salt melt is between about 0.2 and 20 seconds.

References Cited

UNITED STATES PATENTS 3,255,233  6/1966  Kunze et al. ........ 23—196

FOREIGN PATENTS 701,001  12/1964  Canada.

OTHER REFERENCES

Morrison et al., Organic Chemistry, Allyn and Bacon, Inc., Mass., 1963, pp. 443 and 444.

REUBEN FRIEDMAN, *Primary Examiner.*

C. N. HART, *Assistant Examiner.*